Feb. 14, 1961 W. J. SMITH 2,971,907
FILTER MEDIA AND METHOD OF MAKING
Filed Aug. 17, 1955 2 Sheets-Sheet 2

INVENTOR.
WALTER J. SMITH
BY
AGENT

Patent text

2,971,907
FILTER MEDIA AND METHOD OF MAKING

Walter J. Smith, Arlington, Mass., assignor, by mesne assignments, to the United States of America as represented by the United States Atomic Energy Commission Filed Aug. 17, 1955, Ser. No. 529,012

2 Claims. (Cl. 210—504)

This invention relates to filter media and more particularly to filter media capable of filtering out submicronic particles from a liquid.

The development of high efficiency filters has been described in the copending application Serial No. 322,164, filed November 22, 1952, now U.S. Patent No. 2,797,163, in the names of Walter J. Smith and Raymond W. James. This is a continuation-in-part of that application.

A number of different types of filter media have been constructed from cellulosic materials either with or without such additional materials as asbestos and glass fibers but none of these, as far as is known, is suitable for filtering liquids, particularly water or water-containing liquids. Filter media which are essentially cellulosic will swell or soften in the presence of water or water-containing liquids, and the resulting gelatinous mass will cause an increase in flow resistance and a corresponding decrease in the rate of flow of the liquid passing through the filter. Furthermore, in this condition, the cellulosic filters lose their strength and are easily damaged. In addition, the filter media constructed from cellulosic materials are not suitable for filtering liquids of a corrosive nature or those which are required to be filtered at an elevated temperature. In fact, strongly alkaline or acidic liquids will soon deteriorate any filter media containing cellulosic materials, and liquids at temperatures of the order of 500° F. will cause such filter media to char, thus depriving them of their filtering action and creating a hazardous condition. In addition, alternately wetting, and then drying, such cellulosic-type filters causes them to become rough and misshapen and materially shortens their effective periods of usefulness.

In addition to those filter media which have a cellulosic base, filter media have been made from fine glass fibers having diameters of the order of one micron or less. Such filter media, however, are not only expensive, but are difficult to prepare with acceptable strength. The tendency of such fine glass fibers to "ball up" when being dispersed in water or other dispersing liquid adds difficulty to the manufacture of an all-glass filter medium. In addition, if the very fine glass fibers are permitted to mat in a relatively solid filter, there will result a marked decrease in liquid pressure as the liquid passes through the filter. All-glass filter beds having very little or no binding agents have been used but these cannot easily be formed into sheets or shapes, and they do not possess sufficient structural strength to be inserted in frames, or otherwise mounted.

In view of the fact that now many industrial processes such as water-purification and the clarification of process solutions require highly efficient removal of submicron-sized particles from large quantities of water or water-containing liquids, it is desirable to be able to make filter media, capable of performing such filtration, which will not be adversely affected either in performance or strength characteristics by the liquid passing through them. Furthermore, it is often necessary to be able to filter submicronic particles from hot and/or corrosive liquids, such as strong salt solutions or pickling solutions.

It is therefore an object of this invention to provide filter media which are capable of efficiently filtering submicronic particles from water and water-containing liquids and which are not deteriorated by the liquid as are filter media having a cellulosic base. It is a further object to provide filter media which are capable of filtering submicronic particles from a liquid which is at an elevated temperature and/or corrosive in nature. It is an additional object to provide filter media which can tolerate alternate wetting and drying without loss of effectiveness or change in shape. It is another object of this invention to provide filter media which may be so constructed, and so mounted as to give them improved structural strength. It is further an object to provide filter media which will have a particularly low pressure drop or which will exhibit low flow resistance to a liquid as it passes through the filter. It is still another object to provide filter media which may be made easily and economically. These and other objects will become apparent in the following description of this invention.

The present invention is based on the discovery that filtering media, having the desired qualities embodied in the objects stated above, can be prepared by forming a supporting network of inorganic, vitreous monofilament fibers and then incorporating into such supporting network additional inorganic fibers which serve as the filtering means. The making of such filter media requires the elimination of any balling-up or unwanted aggregation of the supporting network fibers, the binding of these fibers and the incorporating of the filtering fibers into the network to give a final sheet, mat, or form capable of being handled. Finally, suitable mounting means and arrangements must be devised to make the filter media suitable for the passage of liquids through them.

Although the filter media of this invention are in no sense a type of paper, i.e., with a cellulosic base, paper-making equipment may be conveniently employed to form the filter media, thus making production relatively simple and easily controlled. However, other processes not requiring the large quantities of water used in paper-making equipment are equally applicable to the production of the filter media of this invention.

The process of this invention is set forth in the following description and with reference to the accompanying drawings in which.

If the process of this invention is based on paper-making techniques, it is necessary to treat the fibers of the supporting network to prevent their balling or agglomerating. It is well understood that the surface of vitreous fibers such as glass in an aqueous dispersion are hydrated and, depending upon their composition, they impart a more or less alkaline character to such dispersion. It is believed that the residual forces or valences existing at the surfaces of the fibers cause such fibers to seize each other and hence to interfere with the proper sheeting out of such fibers and also to interfere with the binding of the fibers into a proper supporting network. By reducing such surface attraction and rendering the surfaces compatible with the binding agents, the balling of the fibers during the dispersing and mixing steps is not only eliminated prior to formation of the network, but also full utilization of the binding qualities of the binding agent is realized to give the maximum strength in the supporting network. In our previous application, Serial No. 322,164, the fiber treating required to prevent balling consisted of adding a so-called "priming agent" which was preferably a cationic resin.

By the process of this invention, undue balling or agglomerating is prevented by making the dispersing liquid acidic and by controlling the pH throughout the process, thus eliminating the need for any appreciable quantities of a priming agent. After the fibers which form the supporting network have been dispersed in a large quantity of liquid, the pH of which has been properly adjusted, the binding agent, any additives (such as anti-foaming agent, dispersing agent for aiding the dispersion process, and plasticizer for the binding agent), and the inorganic filtering fibers are introduced.

Figure 1:
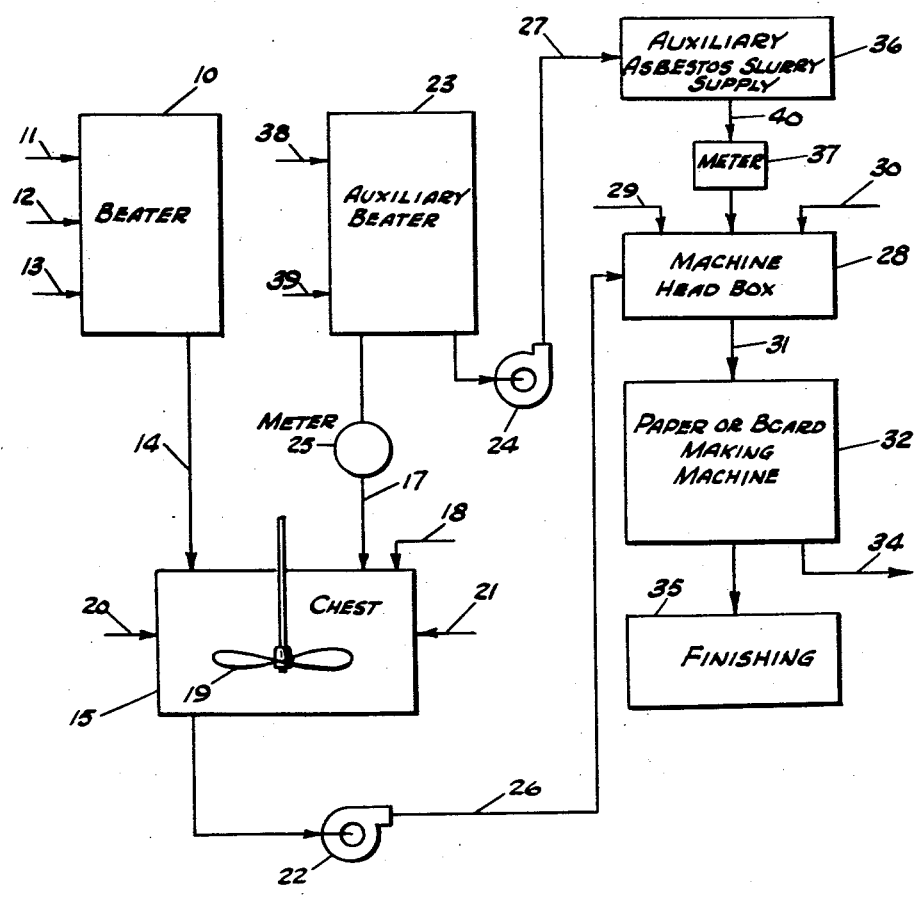
Fig. 1 is a schematic flow diagram of a representative process, based on paper-making techniques, suitable for making the filter media of this invention.

This process will be better understood with reference to Fig. 1 which represents a typical process suitable for making the filter media of this invention. Into beater 10 are introduced water (the dispersing liquid) through line 11, acid and alum (the pH controlling agents) through line 12 and the inorganic vitreous fibers which are to form the supporting network through line 13. (This inorganic vitreous fibrous material will hereinafter be referred to as glass for sake of simplicity.) After these materials have been thoroughly dispersed in beater 10 they are led by line 14 into chest 15 which is equipped with a stirrer 19. Into auxiliary beater 23 there are introduced water through line 38 and the inorganic filtering material through line 39. (This filtering material will be referred to as asbestos as an example of a suitable material.) After the asbestos has been beaten and formed into a uniform water slurry it is led by line 17, which contains a meter 25, into chest 15. Into chest 15 are also introduced the binding agent through line 18, additional water through line 21 and any necessary additives, such as anti-foaming and dispersing agents, through line 20. After the components have been thoroughly mixed in chest 15 the dispersion is removed therefrom and by pump 22 directed by line 26 to the machine head box 28. Into machine head box 28 are also brought additional water through line 29, and any necessary additional anti-foaming agent through line 30. When asbestos is used as a filtering material it is preferable to have an auxiliary asbestos slurry supply 36 which is fed by line 27 through pump 24 from the auxiliary beater 23. If control test samples drawn off from line 34 indicate the need for further asbestos, an additional quantity of the asbestos slurry is admitted into machine head box 28 from the auxiliary asbestos supply 36 through line 40 which contains meter 37. From machine head box 28 the final dispersion is drawn off through line 31 into any suitable type of paper or board making machine 32. From machine 32 the product then passes into a suitable finishing device 35. Samples may be taken from line 34 at the dry end of machine 32 to determine the amount of additional asbestos slurry required from the auxiliary supply 36. If fine glass is used in the system in place of asbestos as a filtering material, then the auxiliary slurry supply 36, the meter 37 and pump 24 along with the lines leading to and from them, may be eliminated.

Although the above order of processing and mixing is convenient for controlling the length of fibers and their dispersion and also for controlling the quality of the final filter media, any other suitable order may be employed. For example, the fibers forming the supporting network and those serving as the filtering fibers may be beaten and dispersed together.

The equipment for the process as outlined above and in Fig. 1 may conveniently be the type of equipment used in paper making. The paper or board making machine may be a Fourdrinier machine or one suitable for making fiber boards. Alternatively, the final dispersion as it emerges from machine head box 28 may be placed on a porous frame as is employed in the preparation of hand sheets, or the water may be removed by any other suitable method while forming the dispersed material into its desired shape. Sheets made by any of the above methods may range in thickness from a few thousandths of an inch to several inches or more. Shaped articles can also be made by suitable methods.

Methods, other than those used generally in paper making, which provide suitable means for forming sheets or mats may also be employed. Thus the fibers making up the supporting network and the filtering fibers, along with the binding agent in a solution or dispersion, may be blown or impelled against a continuous collecting screen to build up a desired thickness. The sheets or mats thus formed may be dried to remove any moisture or liquid and if desired, they may then be sufficiently compressed to control the final thickness. In such a process it may be desirable to cut or chop the fibers to suitable lengths before they are incorporated into the filter.

The tensile strength of filter media made in accordance with this invention is not dependent upon the material of the inorganic vitreous fibers, which of themselves have extremely high tensile strength, but rather upon the nature and character of the bonds holding the individual fibers together to form a continuous supporting network. It is evident that any fibers or fiber agglomerates which are rolled up upon themselves or balled up and not tightly bonded in fixed relationship to other fibers through the mat will contribute little to the overall tensile strength. Such agglomerates are to be avoided. In the preparation of filter media it is important to obtain materials of satisfactory flexibility and strength, since they have to withstand considerable handling in assembly operations, such as bending and insertion in frames, while at the same time being able to withstand the force of liquids flowing through them.

However, only sufficient binding agent should be used to give the required structural strength to the supporting network. Thus, the supporting network for the filter media of this invention is in no way a glass-filled plastic or a heavy fiber-board type of product.

For preparing such materials with sufficient flexibility and tensile strength, it is therefore important to provide such a continuous, bonded network through the mass. It is however, by no means necessary that all the constituents of the finished product be thus bonded. In line with this reasoning, the term supporting network is used to refer to that portion of the finished product which is so bonded and substantially contributes to its strength regardless of whether such a network forms a major or minor portion of the material or whether other fibrous portions of the material are thus bonded or not.

The filtering characteristics of the filter media of this invention will depend upon the diameters of the fibers and more especially upon the diameter of the finer or filtering fibers, and upon the ratio of the two fiber sizes. In general, the higher the ratio of fine fibers to supporting network fibers, the more efficient will be the filtration and the greater will be the resistance to liquid flow through the filter media.

The mechanical properties of these filter media will be dependent upon the length of fibers used both for the supporting network and for filtering, the amount and nature of binding agent used, the ratio of supporting network fibers to filtering fibers, and the thickness of the filter mat finally formed. The length of fibers may conveniently be controlled by the amount of beating performed on the fibers or by cutting or chopping, while the binding agent is selected to give the desired degree of flexibility. The remaining factors which determine the mechanical properties may be easily controlled by proper adjustments in the formulations used. The mechanical properties, and hence the parameters influencing them, may be determined, usually experimentally, for each application for which the final filter is required.

The pH control in the process such as illustrated in Fig. 1, may be achieved by the addition of mineral acids such as hydrochloric or sulfuric acid or by the use of such acids in conjunction with alums, such as aluminum sulfate. The pH range may be from about 3 to about 7, while a pH of 4.5 is preferred. The choice of the acid will depend to some extent upon the inorganic vitreous fibers used to form the supporting network. While the strong mineral acids have been mentioned for pH control, other suitable agents including organic acids such as acetic acid may be used equally well.

Binding agents suitable for use in this invention are the linear polymers and preferably the more flexible linear polymers. They may be conveniently introduced into the system as aqueous emulsions or latices of the linear polymer. Such binding agents include, but are not limited to, acrylic resins, neoprene, polyvinyl acetate, polyvinyl chloride, and polymeric butane derivatives. Aqueous acrylic resin dispersions or latices are particularly well adapted for binding agents since they tend to form a coating on the vitreous fibers and to form strong flexible bonds at the points of intersection of the fibers. In many cases it will also be desirable to include plasticizers, fillers, or other compounding agents to give the binding agent the desired physical properties, particularly the desired flexibility. Copolymers or compatible mixtures of such binding agents may also be used.

The fibers used in making the supporting network should be an inorganic vitreous material. Glass fibers having an average diameter ranging from 1 to 8 microns are particularly suitable because, in addition to their being highly resistant to corrosion and capable of tolerating elevated temperatures, they are readily available, uniform in size and grade, and low in cost. The fibers in any one mat may be of approximately the same diameter or may have various diameters over the range indicated. The glass of the glass fibers in the suporting network may be of the conventional silicate type (i.e., the aluminum silicates and borosilicates of the alkaline earth metals) and such natural products as the various rock wools, vitreous silicas, etc. Fibers finer than the range indicated for forming the supporting network may be used for specific types of filter media, provided these fibers leave suitable interstices in the supporting network for the filtering fibers to be retained and held.

The filtering fibers are of an inorganic material, and have, preferably, diameters in the submicron range, i.e., less than one micron. However, in some cases fibers up to 2 microns or more may be used. Fine glass fibers or asbestos fibers are especially well suited as filtering fibers. If asbestos is used, the blue asbestos (crocidolite) is preferred where high strength is important, while the African asbestos (amosite) may be preferred where long fibers are desired, and the Italian asbestos (tremolite) where resistance to chemicals, and especially to acids, is important.

Small amounts of additives may be required in various steps of the process. Thus, for example, if excessive foaming occurs in the beating or mixing steps, an anti-foaming agent such as octyl alcohol may be added. The dispersion of the fibers may be aided by the use of dispersing agents such as the sulfonic acid derivatives (sodium alkyl sulfonate, for example), and the prevention of agglomerates of fibers may be helped by adding small amounts of a cationic resin, such as a urea formaldehyde resin, an inorganic salt containing a chrome complex or a long-chain aliphatic isocyanate. In addition to these additives which aid in the mixing and processing, it may be desirable to add plasticizers or other modifiers for the binding agent to give the desired flexibility or rigidity to the final filter media.

Two typical formulations may be cited to give examples of the compositions of the filter media of this invention. The first contains asbestos as filtering fibers, the second contains fine glass fibers for this purpose.

Example I

Parts by weight

Supporting network, glass fibers, 3 micron average diameter ------------------------------------ 100
Filtering fibers, blue asbestos (crocidolite) -------- 10
Binding agent, polyacrylic resin ------------------ 5
Dispersing agent, sodium alkyl sulfonate ---------- 0.5
Alum (aluminum sulfate) and $H_2SO_4$ sufficient to maintain pH at 4.5.

Example II

Parts by weight

Supporting network, glass fiber, 3 micron average diameter ------------------------------------ 100
Filtering fibers, glass fibers, 0.5 micron average diameter ------------------------------------ 22
Binding agent, polyacrylic resin ------------------ 6
Dispersing agent, sodium alkyl sulfonate ---------- 0.6
Alum (aluminum sulfate) and $H_2SO_4$ sufficient to maintain pH at 4.5.

Normally, as in the examples cited above, the supporting network fibers will be present in quantities from about 4 to 10 times the quantity of filtering fibers used. Since it is desirable to keep the amount of binding agent to a near minimum, primarily to reduce the pressure drop of the liquid which passes through the filter, the quantity of binding agent should preferably amount to from about 1 to 10% of the total weight of the filter.

The filter media of the compositions of these two examples were fabricated by a process similar to that outlined in Fig. 1. In the case of Example II where the filtering fibers were glass the full amount of fine glass, dispersed in water, was run directly into chest 15 (Fig. 1) and no auxiliary supply was introduced into machine head box 28. Foaming was controlled by adding small quantities of octyl alcohol.

In the paper or board making machine 32 care should be taken that water removal at the wet end is uniform across the sheet, and since glass-containing sheets such as the filter media of this invention shrink very little on drying, the machine draws should be adjusted to allow for this. Care should be exercised to prevent application of any appreciable pressure to the finished mats, particularly when wet, since an undue quantity of crushed fibers results in loss of strength and, secondarily, in an increased pressure drop in the liquid to be filtered as it passed across the filter medium.

Extensive testing of the filter media of this invention indicated that they were capable of filtering out submicronic particles with close to 100 percent efficiency from water and water-containing liquids. Furthermore, they were capable of tolerating temperatures up to 500° F. or more. In addition to maintaining their quality as absolute filters through a wide temperature range, the filter media of this invention are capable of withstanding corrosive effects from the addition of such materials as HCl, $HNO_3$, $H_2SO_4$, $NaNO_3$, NaOH, and $HClO_4$ in moderate concentrations.

When the filter media of this invention are supported or mounted in the ways discussed below, they possess good structural strength and dimensional stability, particularly under conditions of alternate wetting and drying.

Figure 2:
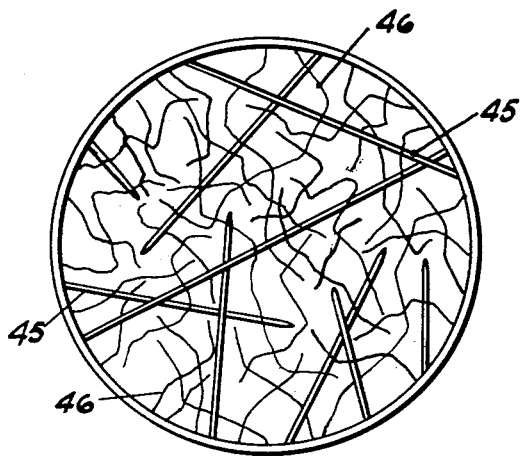
Fig. 2 is a drawing of an enlarged section of a typical filter medium of this invention showing the supporting network fibers and the finer filtering fibers.

Fig. 2 is an enlargement of the structure of a filter medium of this invention and it shows the relationship between the relatively large fibers 45 forming the supporting network and the small, fine fibers 46 serving as the filtering fibers. Microscopic examination indicates that the large fibers become at least partially coated with the binding agent which serves to hold these fibers where they cross and also, to some extent, to hold the fine filtering fibers in place. In addition to being partially bonded to the supporting network, the filtering fibers are held within the interstices of the supporting network.

Figure 3:
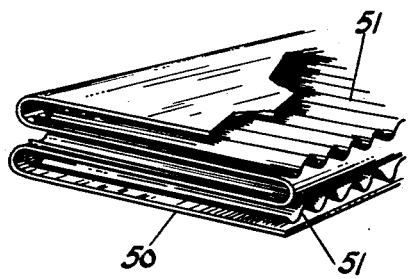
Fig. 3 is a detail sketch of how a filtering medium of this invention may be used with metal separators to form a unit.
Figure 4:
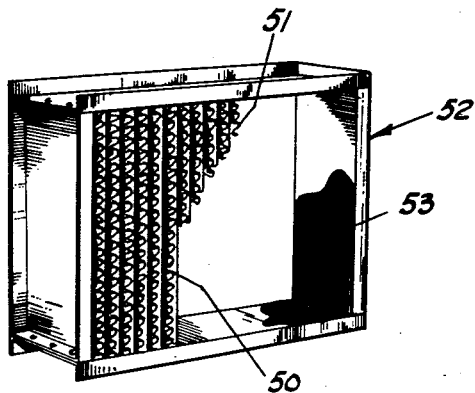
Fig. 4 shows a method of mounting several such units of Fig. 3 in a metal frame.

The filter media of this invention may be molded or otherwise formed into blocks or other shapes of sufficient dimensions to make the shapes structurally self-supporting. However, it has been found more convenient and economical to sheet out the filtering media into thin mats, for example about 0.030 inch thick and to mount the sheets on thin metallic supports. A typical mounting arrangement is illustrated in Fig. 3 where it is shown how a filter medium sheet 50 is pleated and the pleats separated by thin (of the order of 0.0025") aluminum foils 51 which have been corrugated. The filter sheet or sheets thus formed into units may then be placed into a suitable frame 52 (Fig. 4). Some type of cementing material 53 may be placed around the inside of the frame to hold the filtering units in place, to give the entire filter any desired degree of strength, and to insure tightness against any leaks.

Figure 5:
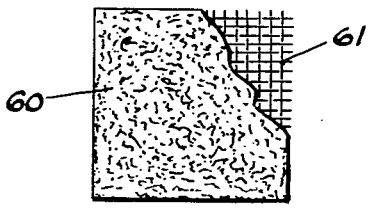
Fig. 5 shows an alternate method of mounting a filter medium of this invention on a screen.

Alternatively single sheets of the filtering medium may be fashioned by any suitable method to a screen to give the filter strength. Thus, in Fig. 5, the sheet of filter medium 60 is backed by a coarse wire screen 61 which gives support without hindering the flow of liquid through the filter. The filter media of this invention are also suitable for use in a filter press.

Various arrangements of these filters are possible. For example, a series of filters having increasing fineness in the direction of the flow of the liquid to be filtered may be used to achieve less rapid clogging (and hence longer life) for the final filter which may be designed to take out the finest particles. Alternatively, any other precleaning may be used to prolong the useful life of the high efficiency filter of this invention.

This invention thus provides filter media which are capable of filtering submicronic particles from aqueous liquid, from those liquids which may be corrosive in nature and those at high temperatures without undue pressure drop in the liquid as it passes through the filter. By use of suitable supporting means it is possible to give the filter media of this invention any desired degree of structural strength. Furthermore these filter media maintain their dimensional stability despite alternate wetting and drying.

What is claimed is:

1. The process for making a filter medium capable of filtering particles in the submicron range from a liquid without causing any appreciable pressure drop in the passage of said liquid across said filter medium, which consists essentially of forming a first aqueous dispersion of inorganic vitreous monofilament fibers, forming a second aqueous dispersion of inorganic fibrous material of mineral derivation, mixing said first and said second dispersions to form a final dispersion, adding to said final dispersion a binding agent, the pH of said first, second and final dispersions being maintained at from about 3 to 7, matting out the solids from said final dispersion and removing substantially all the water from the mat so formed to give a filter medium, said inorganic fibrous material being substantially uncoated by said binder and being capable of filtering out particles less than one micron in size, said binding agent being a flexible linear polymer and being present in an amount which is between about 1 and 10% of the total weight of said filter medium and is enough to give sufficient strength to said filter medium to make it self-supporting, said filter medium being adapted to withstand temperatures up to at least 500° F.

2. The process for making a filter medium capable of filtering particles in the submicron range from a liquid without causing any appreciable pressure drop in the passage of said liquid across said filter medium, which consists essentially of forming a first aqueous dispersion of inorganic vitreous monofilament fibers, forming a second aqueous dispersion of inorganic fibrous material of mineral derivation, mixing said first and said second dispersions to form a final dispersion, adding to said final dispersion a binding agent and any necessary additives, the pH of said first, second and final dispersions being maintained at from about 3 to 7, conducting said final dispersion to a head box, adjusting the composition of said final dispersion by introducing an additional quantity of said second dispersion into said head box, matting out the solids from said final dispersion and removing substantially all of the water from the mat so formed to give a filter medium, said inorganic fibrous material being substantially uncoated by said binder and being capable of filtering out particles less than one micron in size, said binding agent being a flexible linear polymer and being present in an amount which is between about 1 and 10% of the total weight of said filter medium and is enough to give sufficient strength to said filter medium to make it self-supporting, said filter medium being adapted to withstand temperatures up to at least 500° F.

References Cited in the file of this patent

UNITED STATES PATENTS

| Number | Name | Date |
|---|---|---|
| 321,947 | Breyer | July 14, 1885 |
| 929,003 | Norton | July 27, 1909 |
| 2,217,005 | Clapp | Oct. 8, 1940 |
| 2,278,207 | Mathes | Mar. 31, 1942 |
| 2,349,469 | Sloan | May 23, 1944 |
| 2,354,110 | Ford et al. | July 18, 1944 |
| 2,372,865 | Taylor | Apr. 3, 1945 |
| 2,463,722 | Sparagen | Mar. 8, 1949 |
| 2,517,753 | Ximenez | Aug. 8, 1950 |
| 2,568,144 | Cremer et al. | Sept. 18, 1951 |
| 2,601,598 | Daniel et al. | June 24, 1952 |
| 2,611,718 | Steinman | Sept. 23, 1952 |
| 2,681,155 | Graham | June 15, 1954 |
| 2,708,982 | McGuff | May 24, 1955 |

OTHER REFERENCES

M. J. O'Leary et al.: Technical Association of the Pulp and Paper Industry publication, TAPPI, vol. 37, No. 10, October 1954, pages 446–450, and vol. 35, No. 7, July 1952, pages 289–293.

M. J. O'Leary et al.: "Journal of Research of the National Bureau of Standards," vol. 55, No. 1, July 1955, Research Paper 2599, 9 pages.